United States Patent
Yang

(10) Patent No.: US 8,606,980 B2
(45) Date of Patent: Dec. 10, 2013

(54) HARD DISK EXPANSION APPARATUS WITH GOLD FINGERS AND ELECTRONIC DEVICE EMPLOYING SAME

(75) Inventor: Meng-Liang Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 77 days.

(21) Appl. No.: 13/308,557

(22) Filed: Dec. 1, 2011

(65) Prior Publication Data

US 2012/0331198 A1 Dec. 27, 2012

(30) Foreign Application Priority Data

Jun. 23, 2011 (CN) .......................... 2011 1 0170543

(51) Int. Cl.
*H05K 7/10* (2006.01)
*G06F 13/40* (2006.01)
(52) U.S. Cl.
CPC ................................. *G06F 13/4081* (2013.01)
USPC ........................................................ 710/302

(58) Field of Classification Search
USPC ..................... 710/300–317, 8–19, 104–106
See application file for complete search history.

(56) References Cited

U.S. PATENT DOCUMENTS

| 5,996,038 | A * | 11/1999 | Looi et al. ..................... 710/312 |
| 7,405,942 | B1 * | 7/2008 | Lewis ........................... 361/727 |
| 2006/0294266 | A1 * | 12/2006 | Peeke ............................. 710/51 |
| 2007/0016707 | A1 * | 1/2007 | Loffink et al. ................. 710/104 |
| 2007/0067537 | A1 * | 3/2007 | Seto ............................... 710/301 |
| 2007/0070994 | A1 * | 3/2007 | Burroughs et al. ........... 370/381 |
| 2011/0007483 | A1 * | 1/2011 | Li et al. ......................... 361/752 |
| 2011/0219158 | A1 * | 9/2011 | Davis et al. ................... 710/300 |
| 2013/0038999 | A1 * | 2/2013 | Tian et al. ................. 361/679.41 |
| 2013/0039016 | A1 * | 2/2013 | Wu et al. ....................... 361/729 |
| 2013/0088843 | A1 * | 4/2013 | Cong et al. ................... 361/785 |
| 2013/0094167 | A1 * | 4/2013 | Chen et al. ................... 361/791 |

* cited by examiner

Primary Examiner — Raymond Phan
(74) Attorney, Agent, or Firm — Altis Law Group, Inc.

(57) ABSTRACT

A hard disk expansion apparatus includes a printed circuit board (PCB), a connecting finger, and a signal expander. The connecting finger and the signal expander are both positioned on the PCB. The connecting finger receives a group of hard disk signals from a motherboard. The signal expander expands the group of hard disk signals into multiple-group of hard disk signals, and provides the multiple-group of hard disk signals to at least one hard disk.

11 Claims, 2 Drawing Sheets

HARD DISK EXPANSION APPARATUS WITH GOLD FINGERS AND ELECTRONIC DEVICE EMPLOYING SAME

BACKGROUND

1. Technical Field

The disclosure generally relates to expansion apparatuses, particularly to a hard disk expansion apparatus and an electronic device employing same.

2. Description of the Related Art

In order to increase storage space of an electronic device, a serial advanced technology attachment (SATA)/serial attached SCSI (SAS) expansion card can be installed in a motherboard of the electronic device for support of mass storage devices such as hard disk drives. However, the complex connection between the SATA/SAS expansion card and the motherboard is a disadvantage because the SATA/SAS expansion card must be connected to the motherboard via a plurality of cables.

Therefore, there is room for improvement within the art.

BRIEF DESCRIPTION OF THE DRAWINGS

Many aspects of an exemplary hard disk expansion apparatus and an electronic device employing same can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
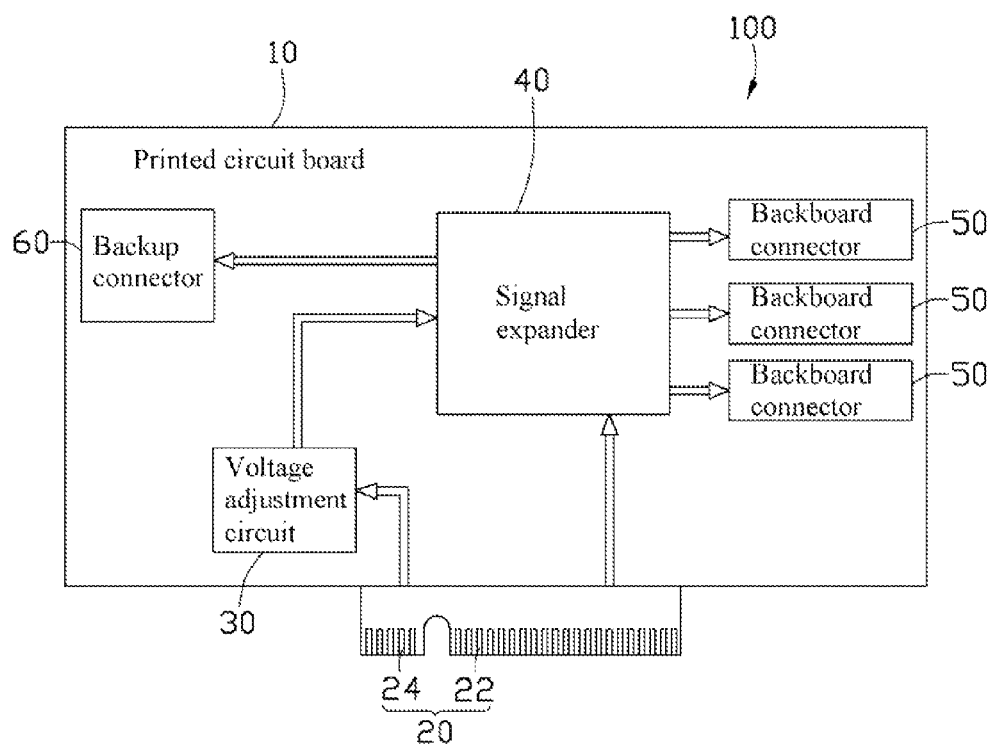
FIG. 1 is a block diagram of a hard disk expansion apparatus, according to an exemplary embodiment.
Figure 2:
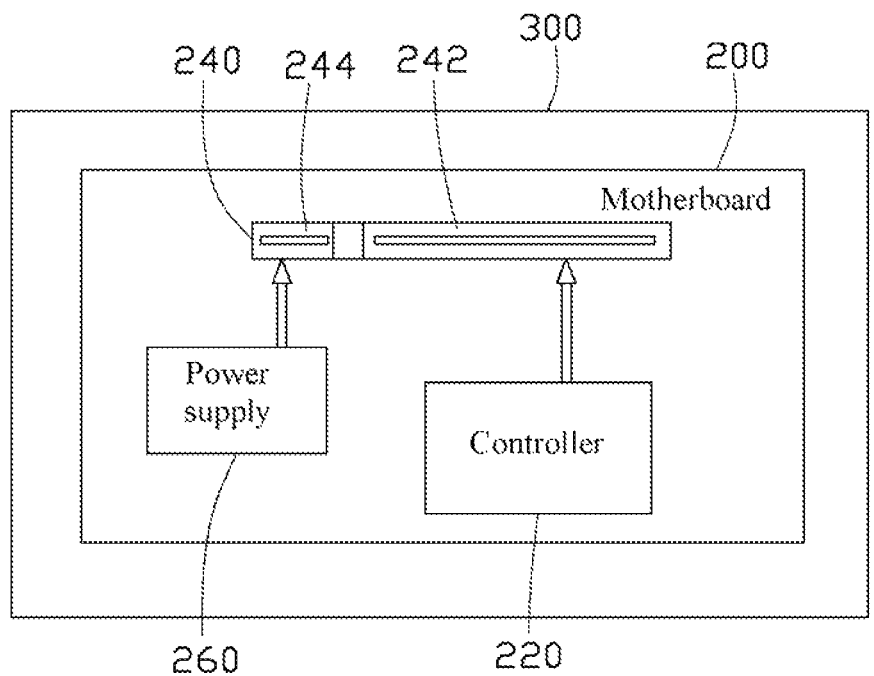
FIG. 2 is block diagram of a motherboard of an electronic device, according to an exemplary embodiment.

FIG. 1 shows a hard disk expansion apparatus 100, according to an exemplary embodiment. Also referring to FIG. 2, the hard disk expansion apparatus 100 is capable of connecting to a motherboard 200 of an electronic device 300. The electronic device 300 can be a personal computer, a server, or any other electronic device.

The motherboard 200 includes a controller 220, an expansion connector 240, and a power supply 260. In one exemplary embodiment, the controller 220 is a platform controller hub (PCH). The controller 220 is capable of outputting a group of hard disk signals, such as 4-way SAS signals or SATA signals. The expansion connector 240 can be a peripheral component interconnect-express (PCIE) connector, which includes a signal transmission port 242 and a power port 244. The signal transmission port 242 is electronically connected to the controller 220, for transmitting the hard disk signals. The power port 244 is electronically connected to the power supply 260 to obtain power.

The hard disk expansion apparatus 100 includes a printed circuit board (PCB) 10, a connecting finger 20, a voltage adjustment circuit 30, a signal expander 40, a plurality of backboard connectors 50, and a backup connector 60. The connecting finger 20, the voltage adjustment circuit 30, the signal expander 40, the backboard connectors 50, and the backup connector 60 are all positioned on the PCB 10. In one exemplary embodiment, the number of the backboard connector 50 is three.

The connecting finger 20 is located at a side of the PCB 10, and can be a PCIE connecting finger. The connecting finger 20 is physically and electronically connected to the expansion connector 240. The connecting finger 20 includes a plurality of signal transmission pins 22 and a plurality of power pins 24. The signal transmission pins 22 are electronically connected between the signal transmission port 242 and the signal expander 40, for transmitting the group of hard disk signals to the signal expander 40. The power pins 24 are electronically connected between the power port 244 and the voltage adjustment circuit 30 to transmit power to the voltage adjustment circuit 30.

The voltage adjustment circuit 30 is electronically connected to the signal expander 40. The voltage adjustment circuit 30 adjusts voltage of the power outputted from the power supply 260 to enable the signal expander 40.

The signal expander 40 is electronically connected to the plurality of backboard connectors 50 and the backup connector 60. The signal expander 40 is operable to expand the group of hard disk signals into multiple-group of hard disk signals. In one exemplary embodiment, the signal expander 40 expands the group of hard disk signals into 4-group of hard disk signals, and the 4-group of hard disk signals are respectively transmitted to the three backboard connectors 50 and the backup connector 60.

The backboard connector 50 can be electronically connected to a hard disk via a backboard (not shown), so that the backboard connector 50 can transmit one group of hard disk signals from the signal expander 40 to the corresponding hard disk.

The backup connector 60 can be electronically connected to a redundant array of independent disks (RAID) card, for connecting more hard disks via the RAID card.

If the electronic device 300 needs a larger storage space, the hard disk expansion apparatus 100 can be connected to the expansion connector 240 of the motherboard 200 via the connecting finger 20, and at least one hard disk can be connected to the plurality of backboard connectors 50. The voltage adjustment circuit 30 obtains power outputted from the power supply 260 via the power pins 24, and then powers the signal expander 40. The signal expander 40 expands the group of hard disk signals into the multiple-group of hard disk signals, and provides the multiple-group of hard disk signals to the at least one hard disk. Thus, direct communication between the at least one hard disk and the motherboard 200 is enabled. Additionally, the signal expander 40 transmits one group of hard disk signals to the backup connector 60, and effective communication between motherboard 200 and more hard disks can be achieved.

The hard disk expansion apparatus 100 can be directly and physically connected to the motherboard 200 via the connecting finger 20, and complex connection between the hard disk expansion apparatus 100 and the motherboard 200 is not needed. Thus, the electronic device 300 has a simple structure and low cost.

Although numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of exemplary disclosure to the full extent indicated by the broad general meaning of the terms in which the appended claims are expressed.

What is claimed is:

1. A hard disk expansion apparatus in communication with a motherboard and at least one hard disk, the motherboard comprising an expansion connector with a signal transmission port and a power port, the hard disk expansion apparatus comprising:
    a printed circuit board (PCB);
    a connecting finger being a peripheral component interconnect-express (PCIE) gold finger, and positioned on the PCB, the connecting finger comprising a plurality of signal transmission pins and a plurality of power pins;
    a signal expander positioned on the PCB and electronically connected to the connecting finger; and
    a voltage adjustment circuit electronically connected between the power pins and the signal expander;
    wherein the power pins are inserted into the power port of the expansion connector to obtain power from the motherboard, the voltage adjustment circuit adjusts voltage of the power to enable the signal expander, the signal transmission pins are inserted into the signal transmission port of the expansion connector of the motherboard to receive a group of hard disk signals from the motherboard, the signal expander expands the group of hard disk signals into multiple-group of hard disk signals, and provides the multiple-group of hard disk signals to the at least one hard disk.

2. The hard disk expansion apparatus as claimed in claim 1, further comprising a plurality of backboard connectors electronically connected between the signal expander and the at least one hard disk, wherein the signal expander transmits the multiple-group of hard disk signals to the plurality of backboard connectors.

3. The hard disk expansion apparatus as claimed in claim 1, wherein the connecting finger is located at a side of the PCB.

4. The hard disk expansion apparatus as claimed in claim 1, wherein the connecting finger is physically and electronically connected the motherboard.

5. The hard disk expansion apparatus as claimed in claim 1, wherein the signal transmission pins are electronically connected to the signal expander to transmit the group of hard disk signals.

6. The hard disk expansion apparatus as claimed in claim 1, further comprising a backup connector electronically connected to the signal expander, wherein the signal expander transmits one group of the hard disk signals to the backup connector.

7. The hard disk expansion apparatus as claimed in claim 6, wherein the backup connector is operable to connect to a redundant array of independent disks (RAID) card.

8. An electronic device, comprising a motherboard and a hard disk expansion apparatus, the motherboard comprising an expansion connector with a signal transmission port and a power port, the hard disk expansion apparatus comprising:
    a printed circuit board (PCB);
    a connecting finger being a peripheral component interconnect-express (PCIE) gold finger, and positioned on the PCB, the connecting finger comprising a plurality of signal transmission pins and a plurality of power pins;
    a signal expander positioned on the PCB and electronically connected to the connecting finger; and
    a voltage adjustment circuit electronically connected between the power pins and the signal expander;
    wherein the power pins are inserted into the power port of the expansion connector to obtain power from the motherboard, the voltage adjustment circuit adjusts voltage of the power to enable the signal expander, the signal transmission pins are inserted into the signal transmission port of the expansion connector of the motherboard to receive a group of hard disk signals from the motherboard, the signal expander expands the group of hard disk signals into multiple-group of hard disk signals, and provides the multiple-group of hard disk signals to at least one hard disk.

9. The electronically device as claimed in claim 8, wherein the motherboard includes a controller operable to output the group of hard disk signals.

10. The electronically device as claimed in claim 9, wherein the signal transmission port is electronically connected to the controller, for receiving the group of hard disk signals.

11. The electronically device as claimed in claim 9, wherein the motherboard includes a power supply, the power port is electronically connected to the power supply to obtain power.

* * * * *